United States Patent
Lin

(10) Patent No.: US 10,348,113 B2
(45) Date of Patent: Jul. 9, 2019

(54) POWER SUPPLY CIRCUIT WITH RESET FUNCTION AND ELECTRONIC APPARATUS HAVING THE SAME

(71) Applicant: CAL-COMP BIG DATA, INC., New Taipei (TW)

(72) Inventor: Min-Hsin Lin, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 68 days.

(21) Appl. No.: 15/436,876

(22) Filed: Feb. 20, 2017

(65) Prior Publication Data

US 2018/0159345 A1 Jun. 7, 2018

(30) Foreign Application Priority Data

Dec. 5, 2016 (CN) .................... 2016 2 1321465 U

(51) Int. Cl.
*H02J 7/00* (2006.01)
*H02M 3/156* (2006.01)
*G06F 1/24* (2006.01)

(52) U.S. Cl.
CPC ............. *H02J 7/0052* (2013.01); *G06F 1/24* (2013.01); *H02J 7/0063* (2013.01); *H02M 3/156* (2013.01); *H02J 2007/0059* (2013.01)

(58) Field of Classification Search
CPC .................. H02J 7/0052; H02J 7/0063; H02J 2007/0059; G06F 1/24; H02M 3/156
USPC ......................................................... 320/107
See application file for complete search history.

(56) References Cited

U.S. PATENT DOCUMENTS

| 2003/0020525 A1* | 1/2003 | Shigemasa ................ G06F 1/24 327/143 |
| 2012/0068539 A1* | 3/2012 | Shiotani ............. H03K 19/0016 307/43 |
| 2013/0166926 A1* | 6/2013 | Yamamizu ......... G03G 15/5079 713/300 |

(Continued)

FOREIGN PATENT DOCUMENTS

| EP | 1282071 | 2/2003 |
| JP | H09274523 | 10/1997 |

OTHER PUBLICATIONS

"Search Report of Europe Counterpart Application", dated Nov. 23, 2017, p1-p10, in which the listed references were cited.

*Primary Examiner* — Nathaniel R Pelton
(74) *Attorney, Agent, or Firm* — JCIPRNET

(57) ABSTRACT

An electronic apparatus including a power supply circuit and an electronic apparatus body is provided. The power supply circuit includes a power input port, a first power circuit, a battery module, a reset circuit and a second power circuit. The power input port receives an input power. The first power circuit converts the input power and outputs a first power to charge the battery module. The reset circuit generates a reset pulse signal responding to that the input power starts to be provided. The battery module is controlled by the first power circuit to provide the first power to the second power circuit if the input power is not provided. The second power circuit converts the first power, accordingly provides an output voltage signal to the electronic apparatus body, and resets the electronic apparatus body by disabling the output voltage signal responding to the reset pulse signal.

8 Claims, 2 Drawing Sheets

(56) References Cited

U.S. PATENT DOCUMENTS

2015/0042300 A1\* 2/2015 Peker ................ H02M 3/156
  323/274
2016/0087480 A1\* 3/2016 Trudeau ............. H02J 7/025
  320/108

\* cited by examiner

POWER SUPPLY CIRCUIT WITH RESET FUNCTION AND ELECTRONIC APPARATUS HAVING THE SAME

CROSS-REFERENCE TO RELATED APPLICATION

This application claims the priority benefit of Chinese application serial no. 201621321465.8, filed on Dec. 5, 2016. The entirety of the above-mentioned patent application is hereby incorporated by reference herein and made a part of this specification.

BACKGROUND OF THE INVENTION

Field of the Invention

The invention relates to a power supply technique, and in particular, a power supply circuit having a reset function and an electronic apparatus including the power supply circuit.

Description of Related Art

Nowadays, electronic apparatuses emphasize multitasking and are thus frequently required to execute a plurality of functions at the same time. When the multitasking of an electronic apparatus exceeds its workload, the electronic apparatus is likely to slow down in its operations, fail to function normally, or have other issues, which finally result in breakdown of the electronic apparatus. When the electronic apparatus breaks down, if the electronic apparatus is not equipped with a watch dog timer and a self-resetting function, the electronic apparatus cannot re-start on its own. Furthermore, if the electronic apparatus is built-in with a rechargeable battery and only a power input port is provided without a physical reset button or power switch button, with the built-in rechargeable battery having power and constantly supplying power to the electronic apparatus, a user cannot reset the electronic apparatus since the electronic apparatus does not include a reset button or a power switch button. In that case, the electronic apparatus will remain in a breakdown state and cannot be used.

SUMMARY OF THE INVENTION

In light of the above, the invention provides an electronic apparatus and a power supply circuit thereof. The power supply circuit generates an output voltage signal according to an input power to supply power to the electronic apparatus. In particular, the power supply circuit is capable of disabling the output voltage signal for a predetermined time period in response to a start of supply of the input power, such that the electronic apparatus could be reset in response to a disable state of the output voltage signal.

The power supply circuit of the invention includes a power input port, a first power circuit, a battery module, a reset circuit, and a second power circuit. The power input port is configured to receive an input power from an external power source apparatus. The first power circuit is coupled to the power input port and the battery module. The first power circuit is configured to convert the input power and accordingly output a first power to the battery module for charging. The reset circuit is coupled to the power input port and configured to generate a reset pulse signal in response to a start of supply of the input power. The second power circuit is coupled to the first power circuit, the battery module, and the reset circuit. When the input power is not provided by the external power source apparatus, the first power circuit controls the battery module to supply power, such that the battery module provides the first power to the second power circuit. The second power circuit performs conversion on the received first power to generate an output voltage signal and disables the output voltage signal in response to the reset pulse signal received from the reset circuit.

In one embodiment of the invention, the reset circuit includes a pulse generator and a pulse width modulation circuit. An input end of the pulse generator is coupled to the power input port to receive the input power and accordingly generate a first pulse signal. The pulse width modulation circuit is coupled to an output end of the pulse generator to receive the first pulse signal and modulate a pulse width of the first pulse signal and accordingly generate the reset pulse signal.

In one embodiment of the invention, the pulse width modulation circuit includes a first resistor, a second resistor, a capacitor, a switch, and a third resistor. The first resistor is coupled between the output end of the pulse generator and a node. The second resistor is coupled between the node and a grounding end. The capacitor is coupled between the node and the grounding end. A first end of the switch is coupled to the grounding end. A control end of the switch is coupled to the node. A second end of the switch generates the reset pulse signal. A first end of the third resistor receives the first power. A second end of the third resistor is coupled to the second end of the switch.

In one embodiment of the invention, a resistance of the second resistor and a capacitance of the capacitor determine the pulse width of the reset pulse signal.

In one embodiment of the invention, the pulse width of the reset pulse signal is between 140 ms and 560 ms.

In one embodiment of the invention, the switch is an NPN bipolar junction transistor or an N-type metal-oxide-semiconductor field-effect transistor.

In one embodiment of the invention, the first power circuit is a battery charger IC.

In one embodiment of the invention, the second power circuit is a low dropout regulator.

The electronic apparatus of the invention includes an electronic apparatus body and the foregoing power supply circuit. The power supply circuit is coupled to a power input end of the electronic apparatus body and provides the output voltage signal to the power input end of the electronic apparatus body to supply power to the electronic apparatus body. The electronic apparatus body is reset in response to a disable state of the output voltage signal.

In one embodiment of the invention, the electronic apparatus is not provided with a power button or a reset button.

In light of the above, the power supply circuit of the electronic apparatus provided in the embodiments of the invention is capable of disabling the output voltage signal for a predetermined time period in response to the start of supply of the input power (or in response to the power-on transition from the input power being unavailable to the input power being available), such that the electronic apparatus body could be reset in response to the disable state of the output voltage signal. Accordingly, in the case where an electronic apparatus is not provided with a physical power switch button or a physical reset button, even if the electronic apparatus breaks down or needs to be re-started with the built-in battery still having power, the power supply circuit can reset the electronic apparatus once the input power is re-provided to the electronic apparatus.

To provide a further understanding of the aforementioned and other features and advantages of the invention, exemplary embodiments, together with the reference drawings, are described in detail below.

BRIEF DESCRIPTION OF THE DRAWINGS

The drawings attached below form a part of the specification of the invention and illustrate the exemplary embodiments of the invention. The attached drawings and the description in the specification together illustrate the principles of the invention.

DESCRIPTION OF THE EMBODIMENTS

Figure 1:
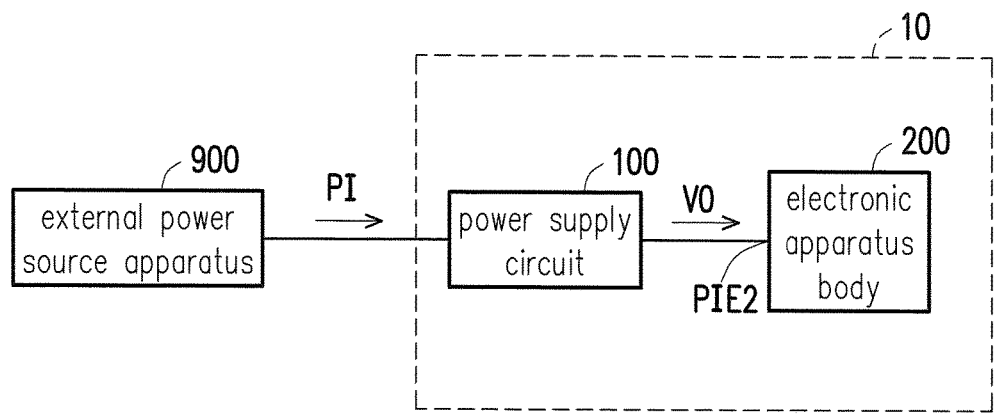
FIG. 1 is a block schematic diagram illustrating an electronic apparatus according to one embodiment of the invention.

To provide a further understanding of the content of the invention, embodiments are provided as examples below for the invention to be implemented accordingly. In addition, wherever applicable, elements/components marked with the same reference numerals in the drawings and the embodiments refer to the same or similar parts.

Referring to FIG. 1, FIG. 1 is a block schematic diagram illustrating an electronic apparatus 10 according to one embodiment of the invention. The electronic apparatus 10 may be any electronic apparatus that is not provided with a physical power button or reset button, and the invention does not limit the type of the electronic apparatus 10. The electronic apparatus 10 includes a power supply circuit 100 and an electronic apparatus body 200. For example, if the electronic apparatus 10 is a body fat measuring apparatus, the electronic apparatus body 200 is a main circuit for measuring body fat.

The power supply circuit 100 is configured to receive an input power PI from an external power source apparatus 900 and convert the input power PI to generate an output voltage signal VO. Alternatively, when the input power PI is zero, the power supply circuit 100 may output its stored power to provide the output voltage signal VO. The power supply circuit 100 is coupled to a power input end PIE2 of the electronic apparatus body 200 and provides the output voltage signal VO to the power input end PIE2 of the electronic apparatus body 200 to supply power to the electronic apparatus body 200. Specifically, the power supply circuit 100 may disable the output voltage signal VO for a predetermined time period in response to a start of supply of the input power PI (or in response to the power-on transition from the input power being unavailable to the input power being available), such that the electronic apparatus body 200 can be reset in response to a disable state of the output voltage signal VO.

For example, in a case where the external power source apparatus 900 is providing the input power PI to the power supply circuit 100, once the electronic apparatus body 200 cannot function normally due to a breakdown for some reason, as long as the external power source apparatus 900 first stops power supply and the external power source apparatus 900 then re-provides the input power PI to the power supply circuit 100, the power supply circuit 100 can provide the output voltage signal VO in the disable state for a predetermined time period to the electronic apparatus body 200, such that the electronic apparatus body 200 could be reset. Alternatively, in a case where the external power source apparatus 900 does not provide the input power PI to the power supply circuit 100, once the electronic apparatus body 200 cannot function normally due to a breakdown for some reason, as long as the external power source apparatus 900 re-provides the input power PI to the power supply circuit 100, the power supply circuit 100 can provide the output voltage signal VO in the disable state for a predetermined time period to the electronic apparatus body 200, such that the electronic apparatus body 200 could be reset.

In one embodiment of the invention, the external power source apparatus 900 could be an adapter plugged to the power supply circuit 100 to supply the input power PI to the power supply circuit 100. Accordingly, through a plugging operation between the external power source apparatus 900 and the power supply circuit 100, the electronic apparatus body 200 could be reset. However, the invention is not limited hereto.

In another embodiment of the invention, the external power source apparatus 900 could be a mobile power apparatus that includes a power supply switch and is coupled to the power supply circuit 100 to supply the input power PI to the power supply circuit 100. Accordingly, through a switching operation on the power supply switch of the mobile power apparatus, the electronic apparatus body 200 could be reset. However, the invention is not limited hereto.

Figure 2:
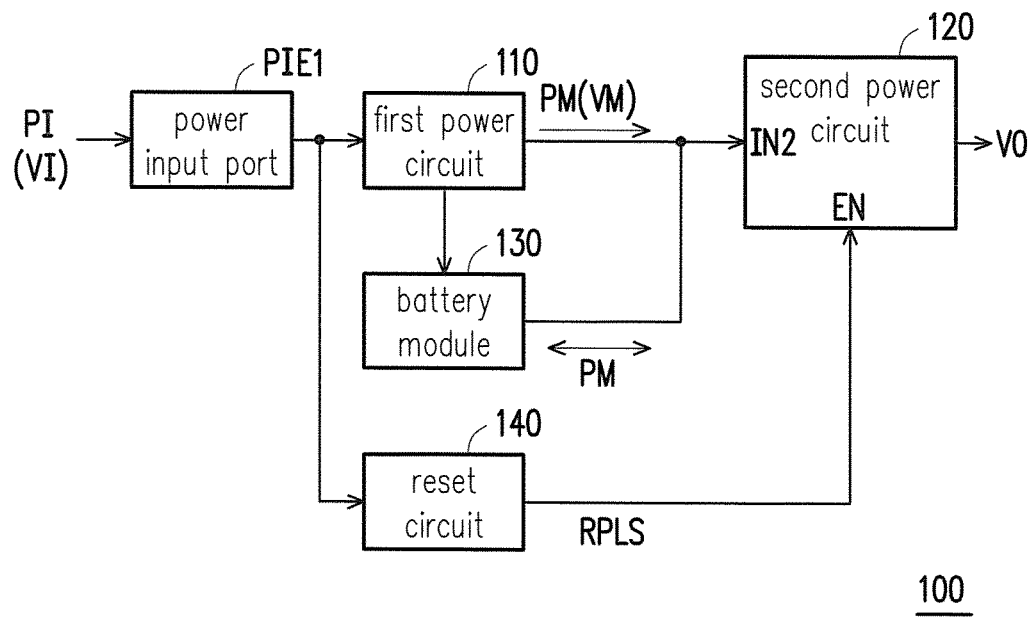
FIG. 2 is a block schematic diagram illustrating a power supply circuit according to one embodiment of the invention.

Referring to FIG. 1 and FIG. 2 together, FIG. 2 is a block schematic diagram illustrating the power supply circuit 100 according to one embodiment of the invention. The power supply circuit 100 includes a power input port PIE1, a first power circuit 110, a second power circuit 120, a battery module 130, and a reset circuit 140. The power input port PIE1 is configured to receive an input power PI from an external power source apparatus 900. The first power circuit 110 is coupled to the power input port PIE1 and the battery module 130. The first power circuit 110 is configured to convert the input power PI and accordingly output a first power PM to the second power circuit 120 and the battery module 130. The first power circuit 110 charges the battery module 130 with the first power PM.

The reset circuit 140 is coupled to the power input port PIE1 to generate a reset pulse signal RPLS in response to a start of supply of the input power PI. An input end IN2 of the second power circuit 120 receives the first power PM and an enable end EN of the second power circuit 120 is coupled to the reset circuit 140 to receive the reset pulse signal RPLS. When the input power PI is not provided by the external power source apparatus (namely, when the input power PI is zero or unavailable), the first power circuit 110 controls the battery module 130 to supply power such that the battery module 130 provides the first power PM to the second power circuit 120. The second power circuit 120 converts the received first power PM to generate an output voltage signal VO and disables the output voltage signal VO in response to the reset pulse signal RPLS.

Figure 3:
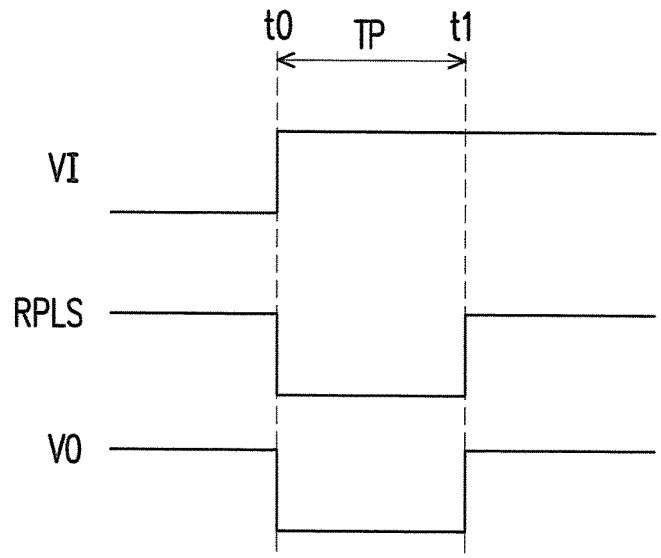
FIG. 3 is a schematic diagram illustrating signal waveforms of the power supply circuit of FIG. 2.

Referring to FIG. 1 to FIG. 3 together, FIG. 3 is a schematic diagram illustrating signal waveforms of the power supply circuit 100 of FIG. 2. For ease of illustration, it is supposed here that a voltage VI of the input power PI is 5V, a voltage VM of the first power PM is 3.0-4.25V, a logic high level of the output voltage signal VO is 3.0-3.3V, the battery module 130 is in a state of having power, and the reset pulse signal RPLS is set at the logic high level (3.0-4.25V) by default to configure the second power circuit 120 in an enable state.

As illustrated in FIG. 3, before a time point t0 the input power PI is zero. Therefore, the battery module 130 provides the first power PM (the voltage VM is 3.0-4.25V) to the second power circuit 120. The second power circuit 120 converts the first power PM provided by the battery module 130 to generate the output voltage signal VO (which is at the logic high level of 3.0-3.3V).

Next, at the time point t0, the external power source apparatus 900 is plugged to the power supply circuit 100 to start supplying the input power PI to the power supply circuit 100. Therefore, the voltage VI received by the power supply circuit 100 rises from 0V to 5V. At this time, the first power circuit 110 converts the input power PI and accordingly outputs the first power PM to charge the battery module 130. In response to the start of supply of the input power PI, the reset circuit 140 generates the reset pulse signal RPLS at a logic low level (0V) to disable the second power circuit 120, which causes the output voltage signal VO to be pulled down from the logic high level (3.0-3.3V) to the logic low level (0V) and thereby resets the electronic apparatus body 200.

After a predetermined time period TP, as shown by a time point t1, the reset circuit 140 provides the reset pulse signal RPLS at the logic high level (3.0-4.25V) to re-enable the second power circuit 120, which causes the output voltage signal VO to be pulled up from the logic low level (0V) to the logic high level (3.0-3.3V) so as to re-supply power to the electronic apparatus body 200.

It shall be mentioned that the relationship between the logic high/low levels of the reset pulse signal RPLS and the enablement of the second power circuit 120 as described in the embodiment above is only an example. People of ordinary skill in the art are all aware that the relationship between the logic high/low levels of the reset pulse signal RPLS and the enablement of the second power circuit 120 may be defined by designers according to the actual needs.

In one embodiment of the invention, a pulse width of the reset pulse signal RPLS illustrated in FIG. 3 (i.e., a time period between the time points t0 and t1) is between 140 ms and 560 ms. However, the invention is not limited hereto and is determined according to the actual application or the design needs of the electronic apparatus body 200.

In one embodiment of the invention, the first power circuit 110 is a battery charger IC. The battery charger IC could be a known battery charging circuit, which may be implemented by (but not limited to) the BQ24092 chip of Texas Instruments (TI), for example, and is thus not repeatedly described here.

In one embodiment of the invention, the second power circuit 120 could be a low dropout regulator (LDO). The low dropout regulator could be a known voltage regulator circuit and is thus not repeatedly described here.

In one embodiment of the invention, the battery module 130 may represent a single battery (or battery component), a battery combination, or a module including one or more batteries (or battery components). Moreover, the battery module 130 may be a rechargeable battery such as a nickel-zinc battery, a nickel-hydrogen battery, a lithium ion battery, a lithium polymer battery, or a lithium iron phosphate battery but is not limited hereto.

In one embodiment of the invention, the reset circuit 140 could be implemented by a digital count circuit. More specifically, the reset circuit 140 could be triggered to start counting at a rising edge of the voltage VI of the input power PI, and stops counting after a count reaches the predetermined time period TP to accordingly generate the reset pulse signal RPLS. Specifically, the digital count circuit could be any known counter and is thus not repeatedly described here.

Figure 4:
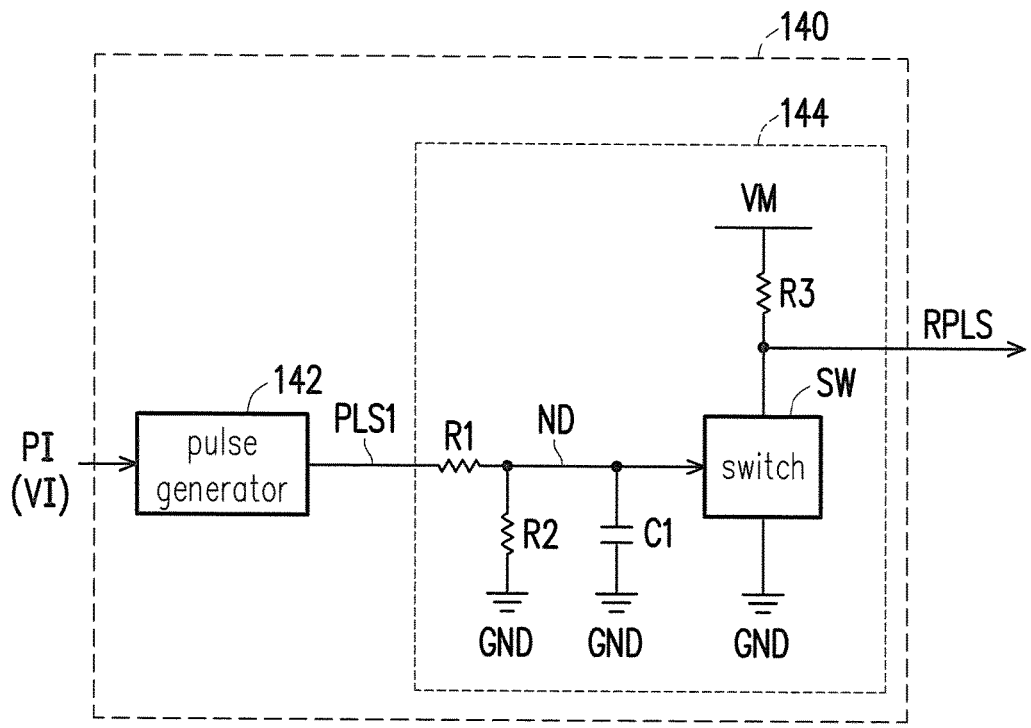
FIG. 4 is a schematic diagram illustrating a circuit framework of a reset circuit according to one embodiment of the invention.

Referring to FIG. 2 and FIG. 4 together, FIG. 4 is a schematic diagram illustrating a circuit framework of the reset circuit 140 according to another embodiment of the invention. The reset circuit 140 includes a pulse generator 142 and a pulse width modulation circuit 144. An input end of the pulse generator 142 is coupled to the power input port PIE1 to receive the input power PI and accordingly generate a first pulse signal PLS1. The pulse width modulation circuit 144 is coupled to an output end of the pulse generator 142 to receive the first pulse signal PLS1 and modulates a pulse width of the first pulse signal PLS1 to generate a reset pulse signal RPLS.

In one embodiment of the invention, the pulse width modulation circuit 144 could be implemented by an analog circuit. As illustrated in FIG. 4, the pulse width modulation circuit 140 includes a first resistor R1, a second resistor R2, a third resistor R3, a capacitor C1, and a switch SW. The first resistor R1 is coupled between the output end of the pulse generator 142 and a node ND. The second resistor R2 is coupled between the node ND and a grounding end GND. The capacitor C1 is coupled between the node ND and the grounding end GND. A first end of the switch SW is coupled to the grounding end GND. A control end of the switch SW is coupled to the node ND. A second end of the switch SW is configured to generate a reset pulse signal RPLS. A first end of the third resistor R3 receives the voltage VM of the first power PM. A second end of the third resistor R3 is coupled to the second end of the switch SW.

In one embodiment of the invention, the switch SW could be an NPN bipolar junction transistor, wherein the first end of the switch SW is an emitter end of the NPN bipolar junction transistor, the second end of the switch SW is a collector end of the NPN bipolar junction transistor, and the control end of the switch SW is a base end of the NPN bipolar junction transistor.

In another embodiment of the invention, the switch SW could be an N-type metal-oxide-semiconductor field-effect transistor, wherein the first end of the switch SW is a source end of the N-type metal-oxide-semiconductor field-effect transistor, the second end of the switch SW is a drain end of the N-type metal-oxide-semiconductor field-effect transistor, and the control end of the switch SW is a gate end of the N-type metal-oxide-semiconductor field-effect transistor.

The implementations of the switch SW mentioned in the foregoing embodiments are merely examples and do not meant to limit the invention. The type of the switch SW shall be determined by the actual application or the design needs.

The operation of the reset circuit 140 of FIG. 4 is described below. Referring to FIG. 3 and FIG. 4 together, before the time point t0, the voltage VI received by the pulse generator 142 is maintained at 0V (the input power PI is zero), and the pulse generator 142 does not generate the first pulse signal PLS1. Therefore, a voltage level of the control end of the switch SW is maintained at a voltage level of the grounding end GND (e.g., the logic low level) through the second resistor R2. At this time, the switch SW is in an off state, such that a voltage level of the reset pulse signal RPLS is maintained at a voltage level of the voltage VM of the first power PM (which is the logic high level) through the third resistor R3.

Next, at the time point t0, the voltage VI received by the pulse generator 142 rises from 0V to 5V. Accordingly, the pulse generator 142 generates the first pulse signal PLS1 which is a positive pulse. In one embodiment of the invention, the positive pulse width of the first pulse signal PLS1 could be between 140 ms and 560 ms, for example, but is not limited hereto and shall be determined by the actual application or the design needs. The first pulse signal PLS1 could be divided by a divider circuit consisting of the first resistor R1 and the second resistor R2 into a dividing signal for charging the capacitor C1. When a cross voltage of two ends of the capacitor C1 (i.e., a voltage at the node ND) rises and is greater than a threshold voltage of the switch SW, the switch SW is turned on, which causes the voltage level of the reset pulse signal RPLS to become the voltage level of the grounding end GND (e.g., the logic low level) through the switch SW.

When the first pulse signal PLS1 which is the positive pulse ends, the capacitor C1 would be discharged through the second resistor R2. When the cross voltage of the two ends of the capacitor C1 (i.e., the voltage at the node ND) is lowered to below the threshold voltage of the switch SW, the switch SW is turned off, which causes the voltage level of the reset pulse signal RPLS to become the voltage VM of the first power PM (which is at the logic high level) again through the third resistor R3, as shown by the time point t1.

It shall be understood that a time constant of an RC circuit consisting of the second resistor R2 and the capacitor C1 is the pulse width of the reset pulse signal RLS (i.e., the predetermined time period TP). In other words, a resistance of the second resistor R2 and a capacitance of the capacitor C1 may be used to determine the pulse width of the reset pulse signal RPLS. Therefore, in one embodiment of the invention, the second resistor R2 could be a variable resistor, or the capacitor C1 could be a variable capacitor. Accordingly, the designers can modulate the pulse width of the reset pulse signal RPLS by adjusting the resistance of the second resistor R2 or the capacitance of the capacitor C1, such that the purpose of adjusting the time length of disablement of the output voltage signal VO could be achieved in order to meet the actual requirement of different electronic apparatus bodies.

In summary of the above, the power supply circuit of the electronic apparatus provided in the embodiments of the invention is capable of disabling the output voltage signal for a predetermined time period in response to the start of supply of the input power (or in response to the power-on transition from the input power being unavailable to the input power being available), such that the electronic apparatus body could be reset in response to the disable state of the output voltage signal. Accordingly, in the case where an electronic apparatus is not provided with a physical power switch button or a physical reset button, even if the electronic apparatus breaks down or needs to be re-started with the built-in battery still having power, the power supply circuit can reset the electronic apparatus once the input power is re-provided to the electronic apparatus.

Although the invention is disclosed in the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A power supply circuit comprising:
   a power input port for receiving an input power from an external power source apparatus;
   a battery module;
   a first power circuit coupled to the power input port and the battery module, wherein the first power circuit is configured to convert the input power and accordingly provide a first power to the battery module for charging and a second power circuit;
   the second power circuit coupled to the first power circuit and the battery module, and configured to generate an output voltage signal according to the first power, wherein when the input power is not provided by the external power source apparatus, the first power circuit stops providing the first power to the battery module and the second power circuit, and the battery module provides a stored power to serve as the first power to the second power circuit; and
   a reset circuit, coupled to the power input port and the second power circuit, and configured to generate a reset pulse signal in response to a start of supply of the input power by plugging the external power source apparatus to the power input port,
   wherein the second power circuit disables the output voltage signal in response to the reset pulse signal received from the reset circuit,
   wherein the reset circuit comprises:
   a pulse generator, an input end of the pulse generator is coupled to the power input port to receive the input power and accordingly generate a first pulse signal; and
   a pulse width modulation circuit coupled to an output end of the pulse generator to receive the first pulse signal and modulate a pulse width of the first pulse signal and accordingly generate the reset pulse signal,
   wherein the pulse width modulation circuit comprises:
   a first resistor coupled between the output end of the pulse generator and a node;
   a second resistor coupled between the node and a grounding end;
   a capacitor coupled between the node and the grounding end;
   a switch, a first end of the switch being coupled to the grounding end, a control end of the switch being coupled to the node, and a second end of the switch generating the reset pulse signal; and
   a third resistor, a first end of the third resistor receiving the first power and a second end of the third resistor being coupled to the second end of the switch.

2. The power supply circuit according to claim 1, wherein a resistance of the second resistor and a capacitance of the capacitor determine the pulse width of the reset pulse signal.

3. The power supply circuit according to claim 2, wherein the pulse width of the reset pulse signal is between 140 ms and 560 ms.

4. The power supply circuit according to claim 1, wherein the switch is an NPN bipolar junction transistor or an N-type metal-oxide-semiconductor field-effect transistor.

5. The power supply circuit according to claim 1, wherein the first power circuit is a battery charger IC.

6. The power supply circuit according to claim 1, wherein the second power circuit is a low dropout regulator.

7. An electronic apparatus comprising:
   an electronic apparatus body; and
   the power supply circuit according to claim 1, which is coupled to a power input end of the electronic apparatus body and provides the output voltage signal to the power input end of the electronic apparatus body to supply power to the electronic apparatus body,
   wherein the electronic apparatus body is reset in response to a disable state of the output voltage signal.

8. The electronic apparatus according to claim 7, wherein the electronic apparatus is not provided with a power button or a reset button.

* * * * *